United States Patent
Lu et al.

(10) Patent No.: US 12,425,898 B2
(45) Date of Patent: Sep. 23, 2025

(54) CONNECTION CONFIGURATION METHOD, DEVICE AND STORAGE MEDIUM

(71) Applicant: GUANGDONG OPPO MOBILE TELECOMMUNICATIONS CORP., LTD., Dongguan (CN)

(72) Inventors: Qianxi Lu, Dongguan (CN); Zhenshan Zhao, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 616 days.

(21) Appl. No.: 17/232,037

(22) Filed: Apr. 15, 2021

(65) Prior Publication Data

US 2021/0235305 A1 Jul. 29, 2021

Related U.S. Application Data

(63) Continuation of application No. PCT/CN2019/070142, filed on Jan. 2, 2019.

(30) Foreign Application Priority Data

| Oct. 19, 2018 | (WO) | PCT/CN2018/111101 |
| Oct. 29, 2018 | (WO) | PCT/CN2018/112508 |
| Nov. 8, 2018 | (WO) | PCT/CN2018/114670 |
| Nov. 27, 2018 | (WO) | PCT/CN2018/117757 |

(51) Int. Cl.
*H04W 24/10* (2009.01)
*H04W 4/06* (2009.01)
*H04W 92/18* (2009.01)

(52) U.S. Cl.
CPC ............. *H04W 24/10* (2013.01); *H04W 4/06* (2013.01); *H04W 92/18* (2013.01)

(58) Field of Classification Search
CPC ....... H04W 24/10; H04W 4/06; H04W 92/18; H04W 4/40; H04W 76/14; H04W 76/10; H04W 76/40; H04W 28/0252
See application file for complete search history.

(56) References Cited

U.S. PATENT DOCUMENTS 10,021,570 B1 * 7/2018 Cai ................. H04W 48/18
2011/0151887 A1 6/2011 Hakola et al.
(Continued)

FOREIGN PATENT DOCUMENTS

| CN | 103037450 A | 4/2013 |
| CN | 103716117 A | 4/2014 |

(Continued)

OTHER PUBLICATIONS

Second Office Action issued in corresponding Chinese Application No. 202110407330.2, mailed Jun. 15, 2022.
(Continued)

*Primary Examiner* — Steven D Nguyen
(74) *Attorney, Agent, or Firm* — BAYES PLLC (57) ABSTRACT

A terminal device, a network device, a storage medium, and a connection configuration method. The connection configuration method includes reporting, by a first terminal device, to a network device connection, status of the first terminal device with at least one second terminal device.

6 Claims, 3 Drawing Sheets

Report, by a first terminal device, terminal device to terminal device connection status to a network device — S201

(56) References Cited

U.S. PATENT DOCUMENTS

| | | | | |
|---|---|---|---|---|
| 2011/0275382 A1* | 11/2011 | Hakola | ........... | H04W 24/10 |
| | | | | 455/452.2 |
| 2013/0150061 A1 | 6/2013 | Shin et al. | | |
| 2016/0338095 A1* | 11/2016 | Faurie | ........... | H04W 28/0278 |
| 2017/0201934 A1* | 7/2017 | Kim | ........... | H04W 48/18 |
| 2017/0245292 A1* | 8/2017 | Agiwal | ........... | H04W 72/23 |
| 2017/0295531 A1* | 10/2017 | Singh | ........... | H04W 36/302 |
| 2017/0331593 A1* | 11/2017 | Sorrentino | ........... | H04L 1/18 |
| 2017/0353819 A1* | 12/2017 | Yin | ........... | H04W 4/70 |
| 2017/0367056 A1* | 12/2017 | Wei | ........... | H04W 52/325 |
| 2019/0223066 A1* | 7/2019 | Xu | ........... | H04W 36/08 |
| 2019/0319723 A1* | 10/2019 | Axmon | ........... | H04B 17/24 |
| 2020/0029353 A1* | 1/2020 | Xu | ........... | H04W 72/21 |
| 2020/0045579 A1 | 2/2020 | Xu et al. | | |
| 2020/0163155 A1* | 5/2020 | Lee | ........... | H04W 72/23 |
| 2020/0187298 A1* | 6/2020 | Chun | ........... | H04W 68/02 |
| 2020/0267025 A1* | 8/2020 | Yu | ........... | H04L 5/0051 |
| 2021/0282099 A1* | 9/2021 | Osawa | ........... | H04L 5/0048 |

FOREIGN PATENT DOCUMENTS

| | | |
|---|---|---|
| CN | 104105088 A | 10/2014 |
| CN | 104284340 A | 1/2015 |
| CN | 104618911 A | 5/2015 |
| CN | 105307194 A | 2/2016 |
| CN | 105338517 A | 2/2016 |
| CN | 106817725 A | 6/2017 |
| CN | 108023696 A | 5/2018 |
| CN | 108260211 A | 7/2018 |
| CN | 108293243 A | 7/2018 |
| CN | 108631917 A | 10/2018 |
| EP | 2763495 A1 | 8/2014 |
| WO | 2013042979 A2 | 3/2013 |
| WO | 2017193808 A1 | 11/2017 |
| WO | 2018084599 A1 | 5/2018 |

OTHER PUBLICATIONS

Communication pursuant to Article 94(3) EPC issued in corresponding European Application No. 19874432.8, mailed May 27, 2022.
First Office action issued in corresponding Chinese Application No. 202110407330.2, mailed Jan. 27, 2022, 14 pages.
First Office action issued in corresponding India Application No. 202127018092, mailed Feb. 15, 2022, 6 pages.
Extended European Search Report issued in corresponding European Application No. 19874432.8, mailed Nov. 11, 2021, 10 pages.
Second Office Action issued in corresponding European Application No. 19874432.8, mailed Nov. 4, 2022.
WO, International Search Report, PCT/CN2018/111101 mailed Jul. 1, 2019, 30 pages.
PCT Written Opinion of the International Searching Authority issued in corresponding International Application No. PCT/CN2018/111101 mailed Jul. 1, 2019, 9 pages.
WO, International Search Report, PCT/CN2018/117757 mailed Jul. 29, 2019, 27 pages.
PCT Written Opinion of the International Searching Authority issued in corresponding International Application No. PCT/CN2018/117757 mailed Jul. 29, 2019, 9 pages.
WO, International Search Report, PCT/CN2019/070142 mailed Jul. 18, 2019, 28 pages.
PCT Written Opinion of the International Searching Authority issued in corresponding International Application No. PCT/CN2019/070142 mailed Jul. 18, 2019, 7 pages.
Extended European Search Report issued in corresponding European Application No. 19874432.8, mailed Nov. 11, 2022, 10 pages.
"Pseudo-CR on Solution to service continuity during MBMS based V2X traffic", Agenda item: 10.2, Source: Huawei, Hisilicon, 3GPP TSG-SA WG6 Meeting #22, SG-180884, Sophia Antipolis, France, Mar. 5-9, 2018, 3 pages.

* cited by examiner

| Report, by a first terminal device, terminal device to terminal device connection status to a network device | S201 |

FIG. 4

| Configure, by a network device, terminal device to terminal device connection status for a first terminal device | S301 |

FIG. 5 first terminal device 400 sending unit 401

CONNECTION CONFIGURATION METHOD, DEVICE AND STORAGE MEDIUM

CROSS-REFERENCE TO RELATED APPLICATIONS

This application is a continuation application of International Application No. PCT/CN2019/070142, filed on Jan. 2, 2019, which claims the benefit of priorities to International Application No. PCT/CN2018/111101, filed on Oct. 19, 2018; International Application No. PCT/CN2018/112508, filed on Oct. 29, 2018; International Application No. PCT/CN2018/114670, filed on Nov. 8, 2018 and International Application No. PCT/CN2018/117757, filed on Nov. 27, 2018, the entire contents of which are incorporated herein by reference.

BACKGROUND

Embodiments of the present disclosure generally relate to wireless communication technologies, and more particularly, to a connection configuration method, a device and a storage medium.

The Vehicle to Everything (V2X) in the fifth generation (5th Generation, 5G) New Radio (NR) system introduces unicast connections and multicast connections; however, there is no effective solution as to how to control the unicast connections or multicast connections by a network device.

SUMMARY

In order to solve the above technical problems, embodiments of the present disclosure provide a connection configuration method, a device and a storage medium, which can realize control of unicast connections or multicast connections of terminal devices by a network device.

According to a first aspect, an embodiment of the present disclosure provides a connection configuration method, including reporting, by a first terminal device, terminal device to terminal device connection status to a network device.

According to a second aspect, an embodiment of the present disclosure provides a connection configuration method, including configuring, by a network device, terminal device to terminal device connection status for a first terminal device.

According to a third aspect, an embodiment of the present disclosure provides a first terminal device, including a sending unit configured to report terminal device to terminal device connection status to a network device.

According to a fourth aspect, an embodiment of the present disclosure provides a network device, including a processing unit configured to configure terminal device to terminal device connection status for a first terminal device.

According to a fifth aspect, an embodiment of the present disclosure provides a terminal device, including a processor and a memory configured to store a computer program which is runnable on the processor. When the processor runs the computer program, the processor is caused to perform steps of the connection configuration method performed by the terminal device.

According to a sixth aspect, an embodiment of the present disclosure provides a network device, including a processor and a memory configured to store a computer program which is runnable on the processor. When the processor runs the computer program, the processor is caused to perform steps of the connection configuration method performed by the network device.

According to a seventh aspect, an embodiment of the present disclosure provides a storage medium storing executable programs which when executed by a processor, cause the processor to implement the connection configuration method performed by the terminal device.

According to an eighth aspect, an embodiment of the present disclosure provides a storage medium storing executable programs which when executed by a processor, cause the processor to implement the connection configuration method performed by the network device.

In the connection configuration method according to embodiments of the present disclosure, the network device configures the terminal device to terminal device connection status for the first terminal device, and the first terminal device reports the terminal device to terminal device connection status to the network device, realizing control of a unicast connection or a multicast connection of the terminal device by the network device.

DETAILED DESCRIPTION

In order to make features and technical contents of embodiments of the present disclosure more clear, implementations the present disclosure will be described in detail below with reference to the accompanying drawings. The attached drawings are for reference and explanation purposes only and are not used to limit embodiments of the present disclosure.

Before describing embodiments of the present disclosure in detail, a brief description regarding the Internet of Vehicles system will be given first.

The Internet of Vehicles system is a sidelink (SL) transmission technology based on a Device-to-Device (D2D) communication. Unlike the traditional LTE systems in which communication data is received or sent through a base station, communication data in the Internet of Vehicles system adopts a device-to-device direct communication, so the has higher spectrum efficiency and lower transmission delay.

V2X is standardized in 3GPP Rel-14, and two transmission modes are defined: Mode 3 and Mode 4.

Figure 1:
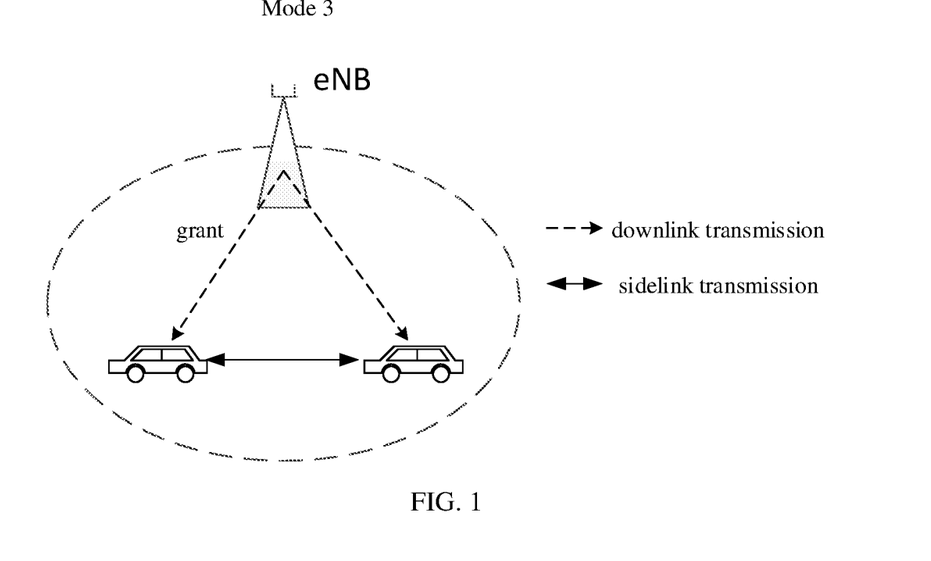
FIG. 1 is a schematic diagram showing a processing flow of data transmission in Mode 3 according to embodiments of the present disclosure.

For Mode 3, the data transmission flow is shown in FIG. 1. The sidelink transmission resources for vehicle-mounted terminals are allocated by a base station, and the vehicle-mounted terminals transmit data on the sidelink according to the resources allocated by the base station. The base station can allocate resources for a single transmission to a terminal, or, can allocate a semi-static transmission resource to a terminal.

Figure 2:
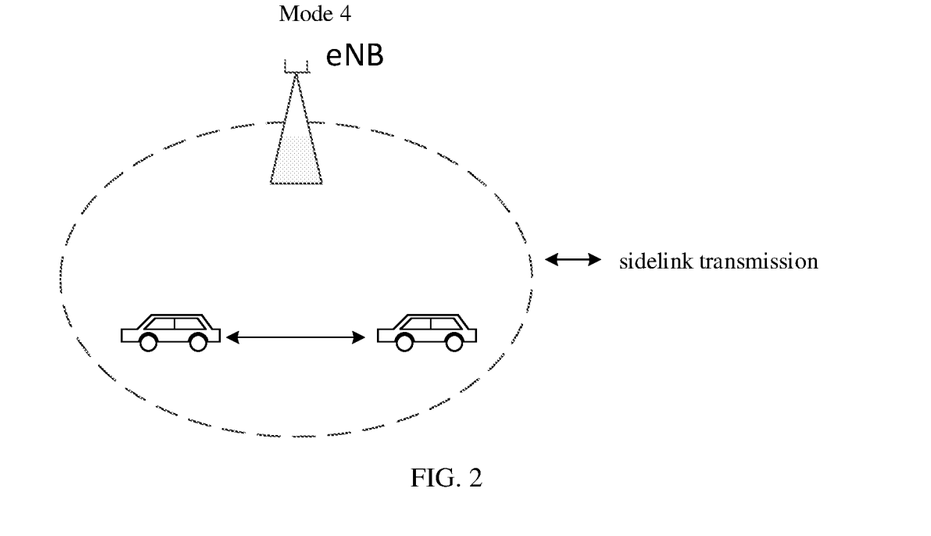
FIG. 2 is a schematic diagram showing a processing flow of data transmission in Mode 4 according to embodiments of the present disclosure.

For Mode 4, the data transmission flow is shown in FIG. 2. The vehicle-mounted terminals adopt a sensing and reservation transmission method. A vehicle-mounted terminal obtains a set of available transmission resources in a resource pool by sensing, and the terminal randomly selects a resource from the set for sidelink data transmission. Since the services in the Internet of Vehicles system have a periodic characteristic, the terminal usually adopts a semi-static transmission method, that is, after the terminal selects a transmission resource, it will continue to use the resource in multiple transmission periods, thereby reducing the probability of resource reselection and resource conflict. The terminal will carry information to reserve resources for the next transmission in the control information of this transmission, so that other terminals can determine whether this resource is reserved and used by the user by detecting the control information of the user, thereby reducing resource conflicts.

In NR-V2X, a unicast connection and a multicast connection are introduced. However, in the unicast connection or multicast connection, there is no solution as to how a network device controls a terminal device to report related information, and how a network device realizes an in-depth control of the unicast connection or multicast connection of a terminal device.

Therefore, embodiments of the present disclosure provide a connection configuration method. The connection configuration method in embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system or a 5G system, etc.

Figure 3:
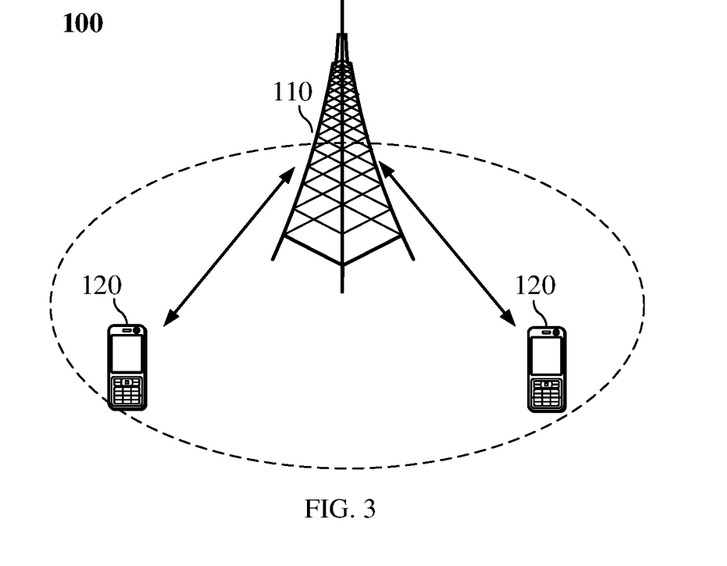
FIG. 3 is a schematic diagram showing a composition structure of a communication system according to an embodiment of the present disclosure.

As an example, the communication system 100 applied in embodiments of the present disclosure may be as shown in FIG. 3. The communication system 100 includes a network device 110, and the network device 110 may be a device that communicates with a terminal device 120 (or called a communication terminal or a terminal). The network device 110 can provide communication coverage for a specific geographic area and can communicate with terminal devices in the coverage area. According to embodiments, the network device 110 may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network side device in a 5G network, or a network device in a future evolved Public Land Mobile Network (PLMN), etc.

The communication system 100 also includes at least one terminal device 120 within the coverage area of the network device 110. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM A broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc.

According to embodiments, Device to Device (D2D) communication may be performed between the terminal devices 120.

According to embodiments, the 5G system or 5G network may also be referred to as a New Radio (NR) system or NR network.

FIG. 3 exemplarily shows one network device and two terminal devices. According to other embodiments, the communication system 100 may include multiple network devices and the coverage of each network device may include other numbers of terminal devices, and embodiments of the present disclosure do not impose specific limitations on this.

According to embodiments, the communication system 100 may also include other network entities such as a network controller and a mobility management entity, and embodiments of the present disclosure do not impose specific limitations on this.

It should be understood that the devices with communication functions in the network/system in embodiments of the present disclosure may be referred to as communication devices. Taking the communication system 100 shown in FIG. 3 as an example, the communication devices may include the network device 110 and the terminal devices 120 with communication functions, and the network device 110 and the terminal devices 120 may be the devices described above, which will not be repeated here. The communication devices may also include other devices in the communication system 100, such as other network entities such as a network controller or a mobility management entity, and embodiments of the present disclosure do not impose specific limitations on this.

Figure 4:
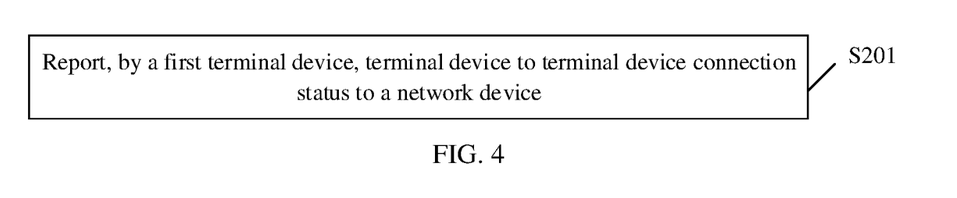
FIG. 4 is a schematic diagram showing an optional processing flow of a connection configuration method applied to a first terminal device according to an embodiment of the present disclosure.

FIG. 4 is a schematic diagram showing an optional processing flow of a connection configuration method applied to a first terminal device according to an embodiment of the present disclosure. As shown in FIG. 4, the method includes the following step.

In step S201, a first terminal device reports terminal device to terminal device connection status to a network device.

In some embodiments, the terminal device to terminal device connection status includes connection status of the first terminal device with at least one second terminal device.

The connection status of the first terminal device with at least one second terminal device is as follows: the first terminal device and the at least one second terminal device perform a unicast communication, or the first terminal device and the at least one second terminal device perform a multicast communication, or the first terminal device and the at least one second terminal device perform a broadcast communication.

According to some embodiments, the terminal device to terminal device connection status includes whether a connection between the first terminal device and at least one second terminal device is maintained. When the connection between the first terminal device and the at least one second terminal device is maintained, the terminal device to terminal device connection status further includes: a quality of the connection between the first terminal device and the at least one second terminal device. The connection quality includes at least one of the following: Reference Signal Receiving Power (RSRP) of a sidelink; Reference Signal Receiving Quality (RSRQ); or Received Signal Strength Indication (RSSI).

In some other embodiments, the terminal device to terminal device connection status includes a Quality of Service (QoS) attribute of a connection between the first terminal device and at least one second terminal device.

In some other embodiments, the terminal device to terminal device connection status includes information relating to first information. The first information is sent by at least one second terminal device to the first terminal device, the first information includes at least one of the following: transmission parameter information of the at least one second terminal device; reception parameter information of the at least one second terminal device; configuration information of a transmission parameter of the first terminal device sent by the at least one second terminal device; configuration information of a reception parameter of the first terminal device sent by the at least one second terminal device; QoS attribute information sent by the at least one second terminal device; parameter configuration information sent by a higher layer of the at least one second terminal device.

In some other embodiments, the first information includes: Public Land Mobile Network (PLMN) information of the at least one second terminal device. According to some embodiments, the PLMN information of the at least one second terminal device includes: a PLMN identifier of the at least one second terminal device and/or a PLMN category of the at least one second terminal device. The PLMN category includes a same PLMN and a different PLMN. The same PLMN means that the HPLMN of the second terminal device is the same as the PLMN of the currently accessed network system; the different PLMN means that the HPLMN of the second terminal device is different from the PLMN of the currently accessed network system.

In an embodiment, the PLMN information of the second terminal device is a Home PLMN (HPLMN) identifier and/or the HPLMN category of the second terminal device.

The transmission parameter information of the second terminal device and/or the reception parameter information of the second terminal device includes: a related parameter of a bearer of the second terminal device. According to some embodiments, the related parameter of the bearer of the second terminal device includes at least one of the following: a parameter of a Radio Resource Control (RRC) layer; a parameter of a Packet Data Convergence Protocol (PDCP) layer; a parameter of a Radio Link Control (RLC) layer; a parameter of a Media Access Control (MAC) layer; a parameter of a physical (PHY) layer; a selection parameter of Radio Access Technology (RAT); or a selection of a communication mode. The selection of the communication mode includes: a mode in which a terminal device autonomously selects a resource and a mode in which a network device schedules a resource for a terminal. The selection parameter of the RAT includes at least one of the following: transmission via an LTE network; transmission via a NR network; transmission via the LTE network or the NR network; or transmission via the LTE network and the NR network.

In embodiments of the present disclosure, the terminal device to terminal device connection status includes resource usage and/or power usage of the first terminal device.

In embodiments of the present disclosure, the terminal device connection status further includes at least one of the following: a propagation mode (in other words, transmission mode); identification of at least one second terminal device; a PLMN identifier of at least one second terminal device and/or a PLMN category of the at least one second terminal device; a destination address; a source address; a Provider Service Identifier (PSID); an Intelligent Transportation Systems Application-Identifier (ITS-AID); an access method; parameter configuration information sent by a higher layer of the first terminal device; a bearer identity; a logical channel identity; and a communication mode. The propagation mode includes unicast, multicast and broadcast. The access method includes access in the NR system and access in the LTE system. The communication mode includes: a mode in which a terminal device autonomously selects a resource and a mode in which a network device schedules a resource for a terminal. The PLMN category of the at least one second terminal device includes a same PLMN and a different PLMN. The source address and the target address may not be all address information, but may be represented by a simplified address index. For example, the address index is a 24-bit address; the address list reported by a terminal device to the network includes 16 addresses, and then 4 bits can be used to identify a specific address in the address list, instead of 24 bits to identify the specific address in the address list. In this way, network overhead can be saved.

The first terminal device may report the terminal device to terminal device connection status to the network device separately according to a varying situation. According to some embodiments, the situation includes at least one of the following: a propagation mode; identification of at least one second terminal device; a PLMN identifier of at least one second terminal device and/or a PLMN category of the at least one second terminal device; a destination address and/or a source address; a PSID; an ITS-AID; an access method; a bearer; a logical channel; a channel condition; speed; a synchronization type; or a communication mode. According to some embodiments, the propagation mode includes unicast, multicast, and broadcast. The channel condition includes a CHannel Busy Rate (CBR). The speed is the moving speed of the first terminal device. The access method is access via the LTE system or access via the NR system. The communication mode includes: a mode in which a terminal device autonomously selects a resource and a mode in which a network device schedules a resource for a terminal.

According to some embodiments, the terminal device to terminal device connection status reported by the first terminal device to the network device is a value which is obtained after the first terminal device performs a preprocess on the terminal device to terminal device connection status. The preprocess includes at least one of the following: a maximum value process; a minimum value process; or an average value process. In actual implementations, the preprocess is a preprocess performed on at least one of the following: a propagation mode; identification of at least one second terminal device; a PLMN identifier of at least one second terminal device and/or a PLMN category of the at least one second terminal device; a destination address and/or a source address; a PSID; an ITS-AID; an access method; a bearer; a logical channel; a channel condition; speed; a synchronization type; and a communication mode. Taking the situation which is the propagation mode and the preprocess which is the average value process as an example, the propagation mode includes multicast, broadcast and unicast; the value corresponding to multicast is 1, the value corresponding to broadcast is 2, and the value corresponding to unicast is 3. The value obtained after performing the average value process on the propagation mode is 2. Therefore, the preprocess refers to perform the maximum value process, the minimum value process or the average value process on different values corresponding to different situations. When the terminal device to terminal device connection status includes both the propagation mode and the access method, the preprocesses are performed on the propagation mode and the access method, respectively; the above is only an example of the preprocess.

In embodiments of the present disclosure, the terminal device to terminal device connection status further includes: a related parameter of a bearer of the first terminal device. According to some embodiments, related parameter of the bearer of the first terminal device includes at least one of the following: a parameter of an RRC layer; a parameter of a PDCP layer; a parameter of an RLC layer; a parameter of a MAC layer; a parameter of a PHY layer; a selection of RAT; or a selection of a communication mode. The selection of the communication mode includes: a mode in which a terminal device autonomously selects a resource and a mode in which a network device schedules a resource for a terminal. The selection of the RAT includes at least one of the following: transmission via a LTE network; transmission via a NR network; transmission via the LTE network or the NR network; or transmission via the LTE network and the NR network.

In an exemplary implementation, the first terminal device sends an uplink control channel to the network device, and the uplink control channel carries the terminal device to terminal device connection status. Alternatively, the first terminal device sends an uplink data channel to the network device, and the uplink data channel carries the terminal device to terminal device connection status. Alternatively, the first terminal device sends uplink Radio Resource Control (RRC) signaling to the network device, and the RRC signaling carries the terminal device to terminal device connection status. Alternatively, the first terminal device sends a Scheduling Request (SR) to the network device, and the SR carries the terminal device to terminal device connection status. Alternatively, the first terminal device sends a Buffer Status Report (BSR) to the network device, and the BSR carries the terminal device to terminal device connection status.

According to some embodiments, when the terminal device to terminal device connection status is sent from the first terminal device to the network device by sending an uplink control channel, the terminal device to terminal device connection status may be carried in a Physical Uplink Control Channel (PUCCH). The number of bits of information that can be transmitted by different PUCCH formats is different. Therefore, as the contents included in the terminal device to terminal device connection status may be different, the contents can be carried by using a corresponding PUCCH format.

According to some embodiments, when the terminal device to terminal device connection status is sent from the first terminal device to the network device by sending an uplink control channel, the first terminal device also receives Downlink Control Information (DCI) sent from the network device. The DCI is used to allocate sidelink transmission resources for the first terminal device; the DCI carries indication information which is used to determine the transmission resource for the uplink control channel.

For example, the network device sends configuration information to the first terminal device, and the configuration information is used to configure a PUCCH transmission resource set. The network device allocates the sidelink transmission resource for the first terminal device through the DCI, and the DCI may carry indication information. The indication information is used to determine the transmission resource for the PUCCH in combination with the above configuration information. Specifically, for example, the indication information includes index information for determining a transmission resource among multiple PUCCH transmission resources configured by the network. Alternatively, the indication information is used to indicate a time interval between the PUCCH and the DCI, and further, the frequency domain resource for the PUCCH can be indicated. Accordingly, the transmission resource for the PUCCH which is used for transmitting the terminal device to terminal device connection status can be determined.

In the above descriptions, the configuration information is used to configure the transmission resource set for the PUCCH. In exemplary implementations, the configuration information may also be used to configure a transmission resource set for the PSSCH. Specifically, the network device allocates the sidelink transmission resource for the first terminal device through the DCI, and the DCI may carry indication information. The indication information is used to determine the transmission resource for the PSSCH in combination with the above configuration information. Specifically, for example, the indication information includes index information, which is used to determine one transmission resource among multiple PSSCH transmission resources configured by the network. Alternatively, the indication information is used to indicate a time interval between the PSSCH and the DCI, and further, the frequency domain resource for the PSSCH can be indicated. Accordingly, the transmission resource for the PSSCH which is used for transmitting the terminal device to terminal device connection status can be determined.

Figure 5:
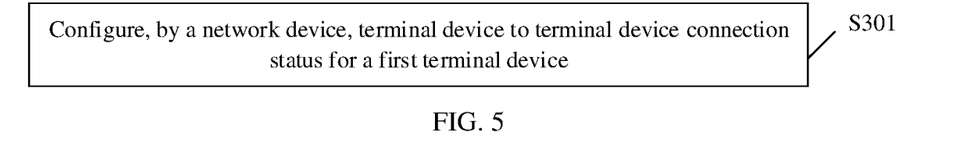
FIG. 5 is a schematic diagram showing an optional processing flow of a connection configuration method applied to a network device according to an embodiment of the present disclosure.

FIG. 5 is a schematic diagram showing an optional processing flow of a connection configuration method applied to a network device according to an embodiment of the present disclosure. As shown in FIG. 5, the method includes the following steps.

In step S301, a network device configures terminal device to terminal device connection status for a first terminal device.

In some embodiments, the terminal device to terminal device connection status includes connection status of the first terminal device with at least one second terminal device.

The connection status of the first terminal device with at least one second terminal device is as follows: the first terminal device and the at least one second terminal device perform a unicast communication, or the first terminal device and the at least one second terminal device perform a multicast communication, or the first terminal device and the at least one second terminal device perform a broadcast communication.

According to some embodiments, the terminal device to terminal device connection status further includes whether a connection between the first terminal device and at least one second terminal device is established and/or released.

In other embodiments, the terminal device to terminal device connection status includes a Quality of Service (QoS) attribute of a connection between the first terminal device and at least one second terminal device.

In still other embodiments, the terminal device to terminal device connection status: information relating to second information. The second information is sent by the first terminal device to the at least one second terminal device. The second information includes at least one of the following: configuration information which is used to indicate a transmission parameter of the at least one second terminal device; or configuration information which is used to indicate a reception parameter of the at least one second terminal device.

In an exemplary embodiment, the terminal device to terminal device connection status includes resource usage and/or power usage of the first terminal device.

In an exemplary embodiment, the terminal device to terminal device connection status includes related configuration of a bearer of the first terminal device. According to some embodiments, the terminal device to terminal device connection status includes at least one of the following: configuration of an RRC layer; configuration of a PDCP layer; configuration of an RLC layer; configuration of a MAC layer; configuration of a PHY layer; a selection of RAT; or a selection of a communication mode. The selection of the communication mode includes: a mode in which a terminal device autonomously selects a resource and a mode in which a network device schedules a resource for a terminal. The selection of the RAT includes at least one of the following: transmission via a LTE network; transmission via a NR network; transmission via the LTE network or the NR network; or transmission via the LTE network and the NR network.

In an exemplary embodiment, the terminal device to terminal device connection status includes whether the first terminal device accepts transmission parameter configuration and/or reception parameter configuration which is sent by at least one second terminal device and is used to indicate to the first terminal device.

In an exemplary embodiment, the terminal device to terminal device connection status includes whether the first terminal device accepts a connection establishment request of at least one second terminal device.

In an exemplary embodiment, the terminal device to terminal device connection status further includes at least one of the following: a propagation mode; identification of at least one second terminal device; a PLMN identifier of at least one second terminal device and/or a PLMN category of the at least one second terminal device; a destination address; a source address; a PSID; an ITS-AID; an access method; parameter configuration information sent by a higher layer of the first terminal device; a bearer identity; a logical channel identity; and a communication mode. . . . The propagation mode includes unicast, multicast, and broadcast. The access method includes access in the NR system and access in the LTE system. The communication mode includes: a mode in which a terminal device autonomously selects a resource and a mode in which a network device schedules a resource for a terminal.

In embodiments of the present disclosure, the terminal device to terminal device connection status is separately configured according to a varying situation. The situation includes at least one of the following: a propagation mode; identification of at least one second terminal device; a PLMN identifier of at least one second terminal device and/or a PLMN category of the at least one second terminal device; a destination address and/or a source address; a PSID; an ITS-AID; an access method; a bearer; a logical channel; a channel condition; speed; a synchronization type; and a communication mode. Taking speed as an example, based on different moving speeds of the first terminal device, the network device configures different terminal device to terminal device connection status for the first terminal device. Taking the propagation mode as an example, based on different propagation modes, such as multicast, broadcast or unicast, the network device configures different terminal device to terminal device connection status for the first terminal device.

According to some embodiments, the terminal device to terminal device connection status further includes a first default configuration. That is, two configurations are included for each situation, one is the configuration of the terminal device to terminal device connection status according to different situations; the other is the first default configuration. When a first condition is met, parameter configuration is performed according to the first default configuration. The first condition includes that it is not possible to perform parameter configuration according to configurations for varying situations. For example, there are three parameter configurations based on the channel condition, speed, and the access method, but currently the first mobile terminal can perform two parameter configurations among the three parameter configurations; in this case, the first terminal device follows the first default configuration to perform parameter configuration.

According to some embodiments, when there are three parameter configurations for different situations, parameter configuration is performed according to a preset priority order for configurations.

In exemplary implementations, parameter configuration is achieved through at least one of RRC signaling, broadcast RRC signaling, and pre-configured information.

Figure 6:
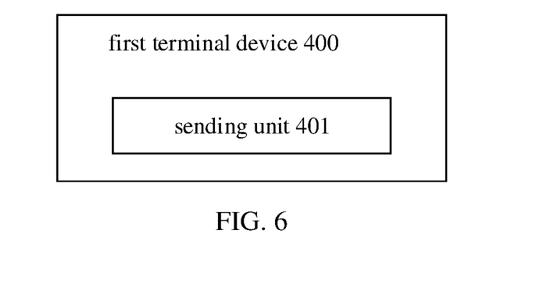
FIG. 6 is a schematic diagram showing a composition structure of a first terminal device according to an embodiment of the present disclosure.

Based on the above connection configuration methods, an embodiment of the present disclosure also provides a first terminal device. FIG. 6 is a schematic diagram showing a composition structure of a first terminal device 400 according to an embodiment of the present disclosure. As shown in FIG. 6, the first terminal device includes a sending unit 401.

The sending unit 401 is configured to report terminal device to terminal device connection status to a network device.

In some embodiments, the terminal device to terminal device connection status includes: the connection between the first terminal device and at least one second terminal device. The first terminal device and the at least one second terminal device perform a unicast communication, or the first terminal device and the at least one second terminal device perform a multicast communication, or the first terminal device and the at least one second terminal device perform a broadcast communication.

Here, the terminal device to terminal device connection status further includes whether a connection between the first terminal device and at least one second terminal device is maintained. When the connection between the first terminal device and the at least one second terminal device is maintained, the terminal device to terminal device connection status includes: a quality of a connection between the first terminal device and at least one second terminal device. The connection quality includes at least one of the following: RSRP, RSRQ and RSSI of the sidelink.

In some other embodiments, the terminal device to terminal device connection status includes: a QoS attribute of a connection between the first terminal device and at least one second terminal device.

In still other embodiments, the terminal device to terminal device connection status includes information relating to first information; the first information is sent by at least one second terminal device to the first terminal device. The first information includes at least one of the following: transmission parameter information of the at least one second terminal device; reception parameter information of the at least one second terminal device; configuration information of a transmission parameter of the first terminal device sent by the at least one second terminal device; configuration information of a reception parameter of the first terminal device sent by the at least one second terminal device; Quality of Service (QoS) attribute information sent by the at least one second terminal device; parameter configuration information sent by a higher layer of the at least one second terminal device.

In embodiments of the present disclosure, the terminal device to terminal device connection status includes resource usage and/or power usage of the first terminal device.

In embodiments of the present disclosure, the terminal device to terminal device connection status further includes at least one of the following: a propagation mode; identification of at least one second terminal device; a PLMN identifier of at least one second terminal device and/or a PLMN category of the at least one second terminal device; a destination address; a source address; a PSID; an ITS-AID; an access method; parameter configuration information sent by a higher layer of the first terminal device; and a communication mode. The propagation mode includes unicast, multicast and broadcast. The access method includes access in the NR system and access in the LTE system. The communication mode includes: a mode in which a terminal device autonomously selects a resource and a mode in which a network device schedules a resource for a terminal.

Figure 7:
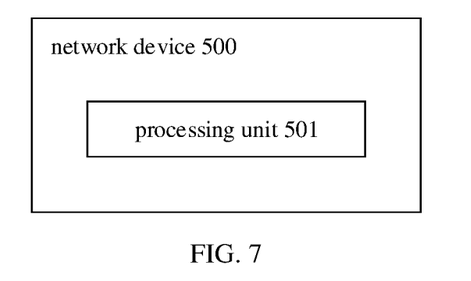
FIG. 7 is a schematic diagram showing a composition structure of a network device according to an embodiment of the present disclosure.

Based on the above connection configuration methods, an embodiment of the present disclosure also provides a network device. FIG. 7 is a schematic diagram showing a composition structure of a network device 500 according to an embodiment of the present disclosure. As shown in FIG. 7, the network device 500 includes a processing unit 501.

The processing unit 501 is configured to configure terminal device to terminal device connection status for a first terminal device.

In some embodiments, the terminal device to terminal device connection status includes connection status of the first terminal device with at least one second terminal device. The first terminal device and the at least one second terminal device perform a unicast communication, or the first terminal device and the at least one second terminal device perform a multicast communication, or the first terminal device and the at least one second terminal device perform a broadcast communication.

In some other embodiments, the terminal device to terminal device connection status includes whether a connection between the first terminal device and at least one second terminal device is established and/or released.

In still other embodiments, the terminal device to terminal device connection status includes a QoS attribute of the first terminal device and a QoS attribute of at least one second terminal device.

In still other embodiments, the terminal device to terminal device connection status: information relating to second information. The second information is sent by the first terminal device to at least one second terminal device. The second information includes at least one of the following: configuration information of a transmission parameter of the at least one second terminal device; or configuration information of a reception parameter of the at least one second terminal device.

In an exemplary embodiment, the terminal device to terminal device connection status includes resource usage and/or power usage of the first terminal device.

In an exemplary embodiment, the terminal device to terminal device connection status includes whether the first terminal device accepts transmission parameter configuration and/or reception parameter configuration which is sent by at least one second terminal device and is used to indicate to the first terminal device.

In an exemplary embodiment, the terminal device to terminal device connection status includes whether the first terminal device accepts a connection establishment request of at least one second terminal device.

In an exemplary embodiment, the terminal device to terminal device connection status further includes at least one of the following: a propagation mode; identification of at least one second terminal device; a PLMN identifier of at least one second terminal device and/or a PLMN category of the second terminal device; a destination address; a source address; a PSID; an ITS-AID; an access method; parameter configuration information sent by a higher layer of the first terminal device; a bearer identity; a logical channel identity; and a communication mode. The propagation mode includes unicast, multicast, and broadcast. The access method includes access in the NR system and access in the LTE system. According to some embodiments, the communication mode includes: a mode in which a terminal device autonomously selects a resource and a mode in which a network device schedules a resource for a terminal.

An embodiment of the present disclosure further provides a terminal device, including a processor and a memory configured to store a computer program which is runnable on the processor. When the processor runs the computer program, the processor is caused to perform the steps of the connection configuration methods which are performed by a terminal device.

An embodiment of the present disclosure further provides a network device, comprising a processor and a memory configured to store a computer program which is runnable on the processor. When the processor runs the computer program, the processor is caused to perform the steps of the connection configuration methods which are performed by a network device.

Figure 8:
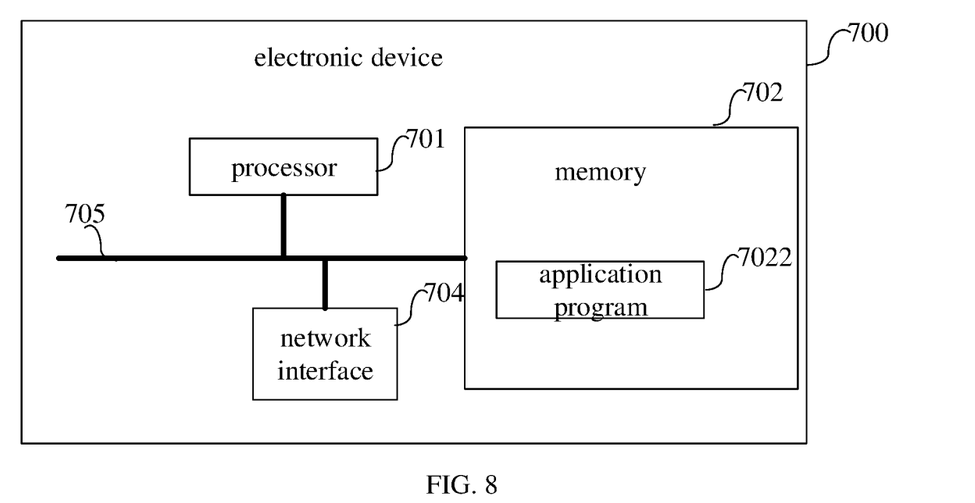
FIG. 8 is a schematic diagram showing a hardware composition structure of an electronic device according to an embodiment of the present disclosure.

FIG. 8 is a schematic diagram showing hardware composition of an electronic device (a network device or a terminal device) according to an embodiment of the present disclosure. The electronic device 700 includes at least one processor 701, a memory 702 and at least one network interface 704. The components in the electronic device 700 are coupled together through a bus system 705. It can be understood that the bus system 705 is used to implement connection and communication between these components. In addition to the data bus, the bus system 705 also includes a power bus, a control bus, and a status signal bus. For clarity of description, various buses are marked as the bus system 705 in FIG. 8.

It can be understood that the memory 702 may be a volatile memory or a non-volatile memory, and may also include both volatile and non-volatile memory. The non-volatile memory can be ROM, Programmable Read-Only Memory (PROM), Erasable Programmable Read-Only Memory (EPROM), Electrically Erasable Programmable Read-Only Memory (EEPROM), Ferromagnetic Random Access Memory (FRAM), Flash Memory, magnetic surface storage, optical disk, or Compact Disc Read-Only Memory (CD-ROM). The magnetic surface storage can be disk storage or tape storage. The volatile memory may be Random Access Memory (RAM), which is used as an external cache. By way of exemplary but not restrictive description, many forms of RAM can be used, such as Static Random Access Memory (SRAM), Synchronous Static Random Access Memory (SSRAM), Dynamic Random Access Memory (DRAM,), Synchronous Dynamic Random Access Memory (SDRAM), Double Data Rate Synchronous Dynamic Random Access Memory (DDRSDRAM), Enhanced ESDRAM (Enhanced Synchronous Dynamic Random Access Memory), Synchronous Link Dynamic Random Access Memory (SLDRAM), or Direct Rambus Random Access Memory (DRRAM). The memory 702 described in embodiments of the present disclosure is intended to include, but is not limited to, these and any other suitable types of memory.

The memory 702 in embodiments of the present disclosure is used to store various types of data to support operation of the electronic device 700. Examples of these data include: any computer program running on the electronic device 700, such as application program 7022. The program for implementing the methods of embodiments of the present disclosure may be included in the application program 7022.

The methods disclosed in the foregoing embodiments of the present disclosure may be applied to the processor 701 or implemented by the processor 701. The processor 701 may be an integrated circuit chip with signal processing capability. In implementations, the steps of the foregoing methods can be completed by a hardware integrated logic circuit or instructions in software form in the processor 701 The aforementioned processor 701 may be a general-purpose processor, a Digital Signal Processor (DSP), or other programmable logic device, discrete gate or transistor logic device, discrete hardware component, and the like. The processor 701 may implement or execute various methods, steps, and logical block diagrams disclosed in embodiments of the present disclosure. The general-purpose processor may be a microprocessor or any conventional processor. The steps of the methods disclosed in embodiments of the present disclosure can be directly embodied as being performed by a hardware decoding processor, or being performed by a combination of hardware and software modules in the decoding processor. The software modules may be located in a storage medium, and the storage medium is located in the memory 702. The processor 701 reads the information in the memory 702 and completes the steps of the foregoing methods in combination with its hardware.

In an exemplary embodiment, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs, MPUs, or other electronic components to perform the aforementioned methods.

An embodiment of the present disclosure provides a storage medium storing computer program.

According to some embodiments, the storage medium can be applied to the network device in embodiments of the present disclosure, and the computer programs cause a computer to perform the corresponding processes implemented by the network device in each method embodiment of the present disclosure. For brevity, repeated descriptions are omitted here.

According to some other embodiments, the storage medium can be applied to the terminal device in embodiments of the present disclosure, and the computer programs cause a computer to perform the corresponding processes implemented by the terminal device in each method embodiment of the present disclosure. For brevity, repeated descriptions are omitted here.

The present disclosure is described with reference to flowcharts and/or block diagrams of methods, devices (systems), and computer program products according to embodiments of the present disclosure. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processor, or other programmable data processing device to generate a machine, so that the instructions executed by the processor of the computer or other programmable data processing device to generate a device that implements the functions specified in one process or multiple processes in the flowcharts and/or one block or multiple blocks in the block diagrams.

These computer program instructions can also be stored in a computer-readable memory that can direct a computer or other programmable data processing device to work in a specific manner, so that the instructions stored in the computer-readable memory produce an article of manufacture including the instruction device. The instruction device implements the functions specified in one process or multiple processes in the flowcharts and/or one block or multiple blocks in the block diagrams.

These computer program instructions can also be loaded on a computer or other programmable data processing device, so that a series of operation steps are executed on the computer or other programmable device to produce computer-implemented processes. In this way, instructions executed by the computer or other programmable device provide steps for implementing the functions specified in one process or multiple processes in the flowcharts and/or one block or multiple blocks in the block diagrams.

The above are only exemplary embodiments of the present disclosure and are not used to limit the protection scope of the present disclosure. Any modification, equivalent replacement and improvement made within the spirit and principle of the present disclosure fall within the protection scope of the present disclosure.

What is claimed is:

1. A method for connection configuration, comprising:
receiving, by a first terminal device, configuration information sent by a network device, wherein the configuration information is used to configure a set of multiple transmission resources for a Physical Uplink Control Channel (PUCCH), and the PUCCH is used for the first terminal device to report connection status of the first terminal device with at least one second terminal device;
receiving, by the first terminal device, Downlink Control Information (DCI), wherein the DCI comprises a sidelink transmission resource allocated for the first terminal device, and the DCI further comprises indication information which comprises index information, and the index information is used for determining one transmission resource among the multiple transmission resources for the PUCCH;
determining, by the first terminal device, the transmission resource for the PUCCH according to the configuration information and the index information;
reporting, by the first terminal device, to the network device, the connection status of the first terminal device with the at least one second terminal device on the transmission resource for the PUCCH determined by the first terminal device;
wherein the connection status reported by the first terminal device to the network device comprises: that the first terminal device and the at least one second terminal device perform a unicast communication; and information relating to Quality of Service (QoS) information sent by the at least one second terminal device to the first terminal device;
wherein the connection status is separately reported according to a Public Land Mobile Network (PLMN) category of the at least one second terminal device, wherein the PLMN category comprises a same PLMN and a different PLMN, the same PLMN means that a Home PLMN (HPLMN) of the at least one second terminal device is the same as a PLMN of a currently accessed network system, and the different PLMN means that the HPLMN of the at least one second terminal device is different from the PLMN of the currently accessed network system.

2. The method according to claim 1, wherein the connection status further comprises: Quality of Service (QoS) information of a connection between the first terminal device and the at least one second terminal device.

3. A method for connection configuration, comprising:
configuring, by a network device, connection status of a first terminal device with at least one second terminal device for the first terminal device;
sending, by the network device, configuration information to the first terminal device, wherein the configuration information is used to configure a set of multiple transmission resources for a Physical Uplink Control Channel (PUCCH), and the PUCCH is used for the first terminal device to report the connection status of the first terminal device with the at least one second terminal device;
sending, by the network device, Downlink Control Information (DCI) to the first terminal device, wherein the DCI comprises a sidelink transmission resource allocated for the first terminal device, and the DCI further comprises indication information which comprises index information, and the index information is used for determining one transmission resource among the multiple transmission resources for the PUCCH;
wherein the connection status reported by the first terminal device to the network device on the transmission resource for the PUCCH determined by the first terminal device according to the configuration information and the index information comprises: that the first terminal device and the at least one second terminal device perform a unicast communication; and information relating to Quality of Service (QoS) information sent by the at least one second terminal device to the first terminal device;
wherein the connection status is separately reported according to a Public Land Mobile Network (PLMN) category of the at least one second terminal device, wherein the PLMN category comprises a same PLMN and a different PLMN, the same PLMN means that a Home PLMN (HPLMN) of the at least one second terminal device is the same as a PLMN of a currently accessed network system, and the different PLMN means that the HPLMN of the at least one second terminal device is different from the PLMN of the currently accessed network system.

4. The method according to claim 3, wherein the connection status further comprises Quality of Service (QoS) information of a connection between the first terminal device and the at least one second terminal device.

5. A first terminal device, comprising:
a memory for storing computer programs; and
a processor,
wherein the processor is configured to execute the computer programs to:
receive configuration information sent by a network device, wherein the configuration information is used to configure a set of multiple transmission resources for a Physical Uplink Control Channel (PUCCH), and the PUCCH is used for the first terminal device to report connection status of the first terminal device with at least one second terminal device;
receive Downlink Control Information (DCI), wherein the DCI comprises a sidelink transmission resource allocated for the first terminal device, and the DCI further comprises indication information which comprises index information, and the index information is used for determining one transmission resource among the multiple transmission resources for the PUCCH;
determine the transmission resource for the PUCCH according to the configuration information and the index information;

report to the network device the connection status of the first terminal device with the at least one second terminal device on the transmission resource for the PUCCH determined by the first terminal device;

wherein the connection status reported by the first terminal device to the network device comprises: that the first terminal device and the at least one second terminal device perform a unicast communication; and information relating to Quality of Service (QoS) information sent by the at least one second terminal device to the first terminal device;

wherein the connection status is separately reported according to a Public Land Mobile Network (PLMN) category of the at least one second terminal device, wherein the PLMN category comprises a same PLMN and a different PLMN, the same PLMN means that a Home PLMN (HPLMN) of the at least one second terminal device is the same as a PLMN of a currently accessed network system, and the different PLMN means that the HPLMN of the at least one second terminal device is different from the PLMN of the currently accessed network system.

6. The first terminal device according to claim 5, wherein the connection status further comprises: Quality of Service (QoS) information of a connection between the first terminal device and the at least one second terminal device.

* * * * *